United States Patent [19]

Parker

[11] Patent Number: 5,033,339
[45] Date of Patent: Jul. 23, 1991

[54] QUICK CHANGE STOCK STOP

[75] Inventor: Kirk R. Parker, Bryan, Ohio

[73] Assignee: Dana Corporation, Toledo, Ohio

[21] Appl. No.: 533,924

[22] Filed: Jun. 6, 1990

[51] Int. Cl.⁵ .............................................. B23B 3/36
[52] U.S. Cl. ...................................... 82/153; 82/156
[58] Field of Search ................ 82/153, 127, 154, 155, 82/156

[56] References Cited

U.S. PATENT DOCUMENTS

| | | |
|---|---|---|
| Re. 24,289 | 3/1957 | Farnsworth . |
| 726,662 | 4/1903 | Ensign . |
| 804,793 | 11/1905 | Chard et al. . |
| 938,483 | 11/1909 | Hanson .................... 82/153 |
| 1,000,011 | 8/1911 | Johnson et al. . |
| 1,050,828 | 1/1913 | Hendrickson . |
| 1,103,479 | 7/1914 | Brown ........................ 82/153 |
| 1,340,811 | 5/1920 | Ballman . |
| 1,838,119 | 12/1931 | Svenson . |
| 2,032,598 | 3/1936 | Shaw . |
| 2,143,255 | 1/1939 | Abe . |
| 2,349,159 | 5/1944 | Freeman . |
| 2,357,514 | 9/1944 | Huennekens et al. . |
| 2,357,739 | 9/1944 | Heckman . |
| 2,368,408 | 1/1945 | Brooking . |
| 2,370,286 | 2/1945 | Berger . |
| 2,405,435 | 8/1946 | Kylin et al. . |
| 2,455,793 | 12/1948 | Monkiewicz . |
| 2,514,600 | 7/1950 | Felleson . |
| 2,549,332 | 4/1951 | Parker . |
| 2,574,653 | 11/1951 | Miller . |
| 2,617,175 | 11/1952 | Drissner . |
| 2,690,702 | 10/1954 | Romans et al. . |
| 2,691,914 | 10/1954 | Roby . |
| 2,730,229 | 1/1956 | Nichta . |
| 2,731,870 | 1/1956 | Colman . |
| 2,794,470 | 6/1957 | Wright . |
| 3,037,404 | 6/1962 | Burg . |
| 3,221,580 | 12/1965 | Millward . |
| 3,489,061 | 1/1970 | Saunderson . |
| 3,580,118 | 5/1971 | Hazel . |
| 3,626,792 | 12/1971 | Eichenhofer . |
| 3,720,123 | 3/1973 | Eichenhofer . |
| 3,855,885 | 12/1974 | Marshall . |
| 4,039,266 | 8/1977 | O'Connell . |
| 4,182,589 | 1/1980 | Boudreault et al. . |
| 4,208,772 | 6/1980 | Earnhardt et al. . |
| 4,322,990 | 4/1982 | Benjamin et al. . |
| 4,485,704 | 12/1984 | Gardner . |
| 4,512,224 | 4/1985 | Terauchi . |
| 4,521,144 | 6/1985 | Ginter .................... 409/218 |
| 4,653,157 | 3/1987 | Alexander . |

OTHER PUBLICATIONS

Handbook for Operators-Acme-Gridley Multiple Spindle Bar Machines, National Acme, 1980, pp. B-16, D-34, D-35.

Primary Examiner—Frederick R. Schmidt
Assistant Examiner—John A. Marlott
Attorney, Agent, or Firm—MacMillan, Sobanski & Todd

[57] ABSTRACT

A stock stop assembly for a multiple spindle lathe is disclosed. A bracket secured to the lathe has a non-threaded aperture formed therethrough. A stock stop includes a head portion having an abutment surface and a threaded shank portion disposed within the bracket aperture. The shank portion can have a flat surface formed thereon. A split locking collar is threaded onto the shank portion. When the shank portion is inserted within the bracket aperture, the locking collar engages the bracket to determine the relative position of the abutment surface. A bore is formed through the adjacent split ends of the lock nut, and a threaded fastener is disposed within the bore. The threaded fastener is tightened to compress the locking collar about the shank portion to secure the locking collar in position. A threaded transverse aperture is also formed in the bracket. A threaded fastener is threaded into the transverse aperture. When tightened, the threaded fastener extends through the transverse aperture into engagement with the flat surface of the shank portion to retain the stock stop in the bracket.

12 Claims, 2 Drawing Sheets

QUICK CHANGE STOCK STOP

BACKGROUND OF THE INVENTION

This invention relates in general to stock stops for use in multiple spindle lathes and in particular to an improved stock stop for positively positioning a length of bar stock within such a lathe which is quickly and easily changeable.

The multiple spindle lathe is a commonly known machine which is designed to simultaneously support a plurality of workpieces (in the form of elongated bars of stock material) and to selectively remove material therefrom. To accomplish this, the spindle lathe is provided with a plurality of workpiece supporting spindles. Typically, four, six, or eight of such spindles are mounted in a circular array on a carrier assembly. Each spindle is constructed such that the bar stock is advanced axially therethrough from a rearward end, where the bar stock is supplied to the spindle lathe, to a forward end, where one or more machine tools are located.

A conventional clamping collet is provided at the forward end of each of the spindles. When the collet is opened, the bar stock can be advanced axially through the spindle so that the leading end thereof is exposed to the machine tools for selective metal removal. A stock feeding mechanism is provided for automatically advancing the bar stock axially through each of the spindles when the collet is opened. The stock feeding mechanism moves the bar stock forwardly through the spindle until the leading end of the bar stock engages a stock stop mounted on the spindle lathe. Then, the collet closes so as to tightly grip the bar stock for engagement by the machine tools to form a finished article.

The stock stop is located on the spindle lathe such that a predetermined length of bar stock is advanced beyond the forward end of the spindle and, therefore, is exposed for engagement by the machine tools. This predetermined length is dependent upon the size and shape of the article to be formed. Obviously, it is desirable that the spindle lathe be capable of machining a number of differently sized and shaped articles. Therefore, the stock stop is generally mounted on the spindle lathe in an adjustable manner so that the relative position thereof can be varied to accommodate the manufacture of differently sized articles.

Although known stock stops are adjustable, they have been found to be rather slow and inefficient to adjust from article to article. Generally, such adjustment requires that an operator reach within the spindle lathe and re-position the stock stop on a trial and error basis until the desired length of bar stock is achieved during a stock feeding operation. This problem is particularly acute when the spindle lathe is used to manufacture low volumes of articles. In this situation, frequent, time-consuming adjustments of the stock stop are necessary. Accordingly, it would be desirable to provide an improved stock stop for a spindle lathe which is quickly and easily adjustable.

SUMMARY OF THE INVENTION

This invention relates to an improved stock stop for a multiple spindle lathe which is quickly and easily adjustable to different positions. The stock stop is carried on a mounting bracket which is secured to the spindle lathe by a plurality of threaded fasteners. The bracket has a non-threaded aperture formed through an upstanding portion thereof. The stock stop includes an enlarged cylindrical head portion and a threaded shank portion. The head portion of the stock stop includes a rearwardly facing flat abutment surface which is adapted to be engaged by the forward end of the bar stock during the stock feeding operation, as described above. The shank portion is disposed within the aperture and is milled to form a flat surface thereon.

A locking collar is threaded onto the shank portion of the stock stop so as to be disposed between the head portion thereof and the upstanding portion of the bracket. When the shank portion of the stock stop is inserted within the aperture of the bracket, the forward face of the locking collar engages the rearward face of the bracket. This engagement determines the relative position of the abutment surface of the stock stop. The locking collar is split so as to have a generally C-shaped configuration. A bore is formed through the adjacent split ends of the lock nut. A portion of the bore is threaded, and a threaded fastener is disposed within the bore. When the threaded fastener is tightened, the locking collar is compressed about the shank portion. Consequently, the amount of friction between the threads of the locking collar and the shank portion is increased such that the locking collar is locked in position on the shank portion.

As mentioned above, the shank portion extends through the aperture formed through the bracket. A transverse aperture is also formed in the bracket. The transverse aperture is threaded and extends into the aperture. A threaded fastener is threaded into the transverse aperture. When tightened, the threaded fastener extends through the transverse aperture into engagement with the flat surface of the shank portion to retain the stock stop in the bracket.

It is an object of this invention to provide an improved stock stop which is quickly and easily adjustable so as to positively position a predetermined length of bar stock relative to a spindle in a multiple spindle lathe.

It is another object of this invention to provide such an improved stock stop which is simple and inexpensive in construction and operation.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
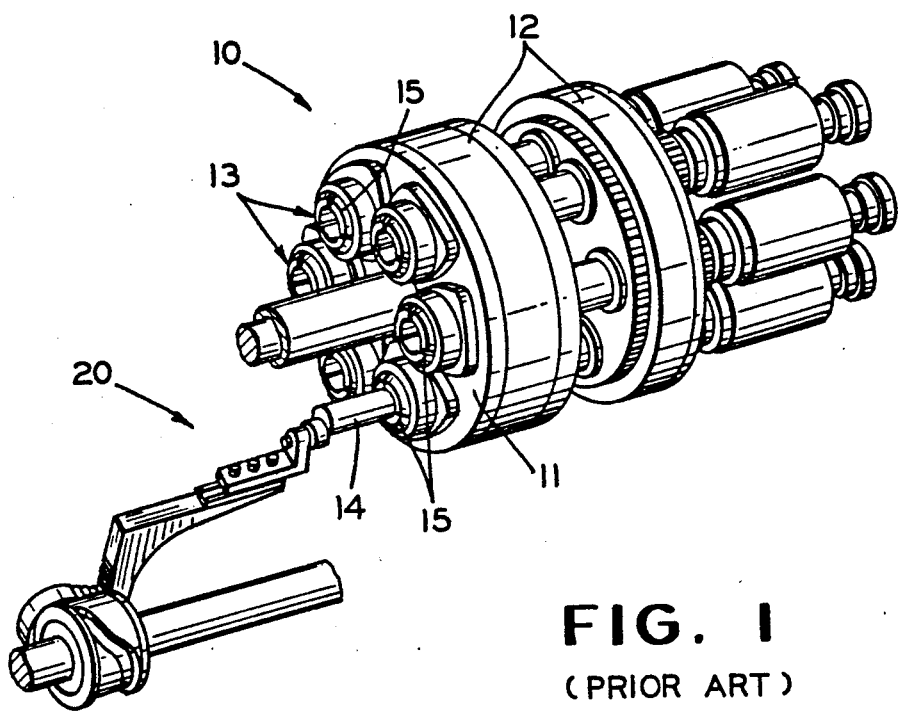
FIG. 1 is a perspective view of the carrier assembly portion of a conventional multiple spindle lathe including a portion of a prior art stock stop assembly.

Referring now to the drawings, there is illustrated in FIG. 1 a carrier assembly portion of a conventional multiple spindle lathe, indicated generally at 10. The spindle lathe 10 is conventional in the art, and the structure and operation thereof will be explained only to the extent necessary to achieve an understanding of this invention. A more detailed explanation of the overall structure and operation of the spindle lathe 10 can be found in the Handbook For Operators for the Acme-Gridley Multiple Spindle Bar Machine published in 1980, the disclosure of which is incorporated herein by reference.

The spindle lathe 10 includes a carrier assembly 11. The carrier assembly 11 is mounted for rotation within two annular carrier journals 12 housed in a frame (not shown) of the spindle lathe 10. A motor or similar means (not shown) is provided for selectively rotating the carrier assembly 11 within the journals 12. A plurality of spindles, indicated generally at 13, are mounted in a circular array in the carrier assembly 11. Each of the spindles 13 is rotatable relative to the carrier assembly 11. As will be explained in greater detail below, the motor selectively rotates the carrier assembly 11 so as to index each of the spindles 13 through a plurality of operating positions.

Each spindle 13 is constructed such that a length of bar stock 14 (only one is illustrated in FIG. 1) is advanced axially therethrough from a rearward end to a forward end (from right to left when viewing the drawings). The bar stock 14 is supplied to the spindle lathe 10 from the rearward end of the spindles 13 through the forward ends thereof, where one or more machine tools (not shown) are located. A conventional clamping collet or chuck 15 is provided at the forward end of each of the spindles 13. When the collet 15 is opened, the bar stock 14 can be advanced axially through the spindle 13 so that the leading end thereof is exposed to the machine tools for selective metal removal.

A conventional stock feeding mechanism (not shown) is provided for automatically advancing the bar stock 14 axially through each of the spindles 13 when the collet 15 is opened. The stock feeding mechanism moves the bar stock 14 forwardly through the spindle 13 until the leading end of the bar stock 14 engages a portion of a stock stop assembly, indicated generally at 20 in FIGS. 1 and 2. The stock stop assembly 20 is positioned on the spindle lathe 10 such that only a predetermined length of bar stock is advanced beyond the forward end of the spindle 13 and, therefore, is exposed for engagement by the machine tools. The structure and operation of the stock stop assembly 20 will be described in detail below. After the bar stock 14 engages the stock stop assembly, 20, the collet 15 is closed so as to tightly grip the bar stock 14 for engagement by the machine tools to form a finished article.

At each of the operating positions, the exposed ends of the bar stock 14, which are clamped in the respective spindles 13 as described above, are aligned with the machine tools mounted on the spindle lathe 10. When so aligned, the spindles 13 are rotated relative to the carrier assembly 11. The machine tools are then moved into engagement with the rotating ends of the bar stock 14 so as to remove material therefrom. When the desired material has been removed, the machine tools are retracted. The carrier assembly 11 is indexed to the next operating position, where further material is removed. Thus, as each length of bar stock 14 is sequentially indexed through each of the operating positions, material is removed therefrom to transform it into a finished article.

Figure 2:
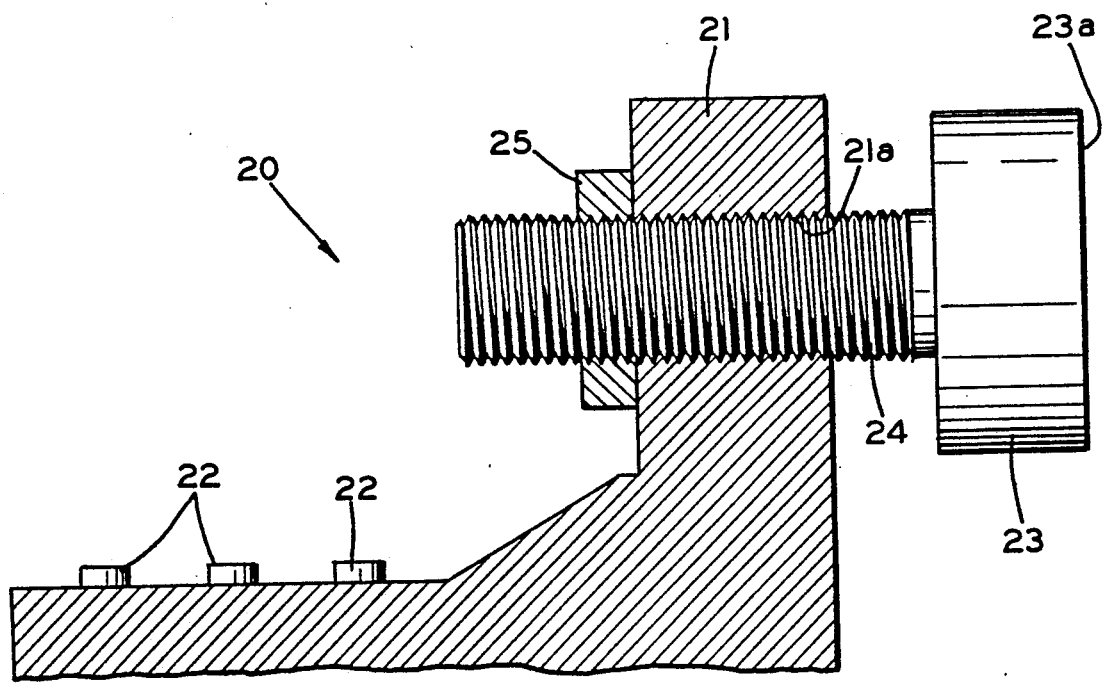
FIG. 2 is a side elevational view of the prior art stock stop assembly, illustrated in FIG. 1.

The structure of the prior art stock stop assembly 20 is illustrated in detail in FIG. 2. As shown therein, the assembly 20 is carried on a cast mounting bracket 21 which is secured to the spindle lathe 10 by a plurality of threaded fasteners 22. The bracket 21 includes an upstanding portion having a threaded aperture 21a formed therethrough. An adjustable stock stop, including an enlarged cylindrical head portion 23 and a threaded shank portion 24, is supported on the bracket 21. The head portion 23 includes a rearwardly facing flat abutment surface 23a which is adapted to be engaged by the leading end of the bar stock 14 during the stock feeding operation, as described above. The shank portion 24 is threaded and cooperates with the threaded aperture 21a formed through the bracket 21.

Because the threaded shank portion 24 of the stock stop cooperates with the threaded aperture 21a of the bracket 21, it can be seen that rotation of the stock stop causes axial movement of the abutment surface 23a relative to the bracket 21 and the collet 15. Thus, the position of the abutment surface 23a can be adjusted closer to or farther away from the forward end of the collet 15 as desired simply by rotating the stock stop. In this manner, the relative position of the abutment surface 23a can be adjusted as desired so that the predetermined length of the bar stock 14 which is exposed for machining can be varied.

In order to prevent the stock stop from inadvertently rotating relative to the bracket 21 during use, a lock nut 25 is threaded onto the end of the shank portion 24. When the stock stop has been rotated to a desired position relative to the bracket 21, the lock nut 25 is rotated relative to the shank portion 24 so as to tightly engage the forward face of the bracket 21, as shown in FIG. 2. Such engagement generates a relatively large amount of friction between the threads of the shank portion 24 and the threaded aperture 21a, thereby preventing relative rotation therebetween. Thus, in order to rotate the stock stop to change the relative position of the abutment surface 23a, the lock nut 25 must first be loosened. Then, the stock stop can be rotated relative to the bracket 21 until the abutment surface 23a is properly positioned, at which point the lock nut 25 is re-tightened.

Figure 3:
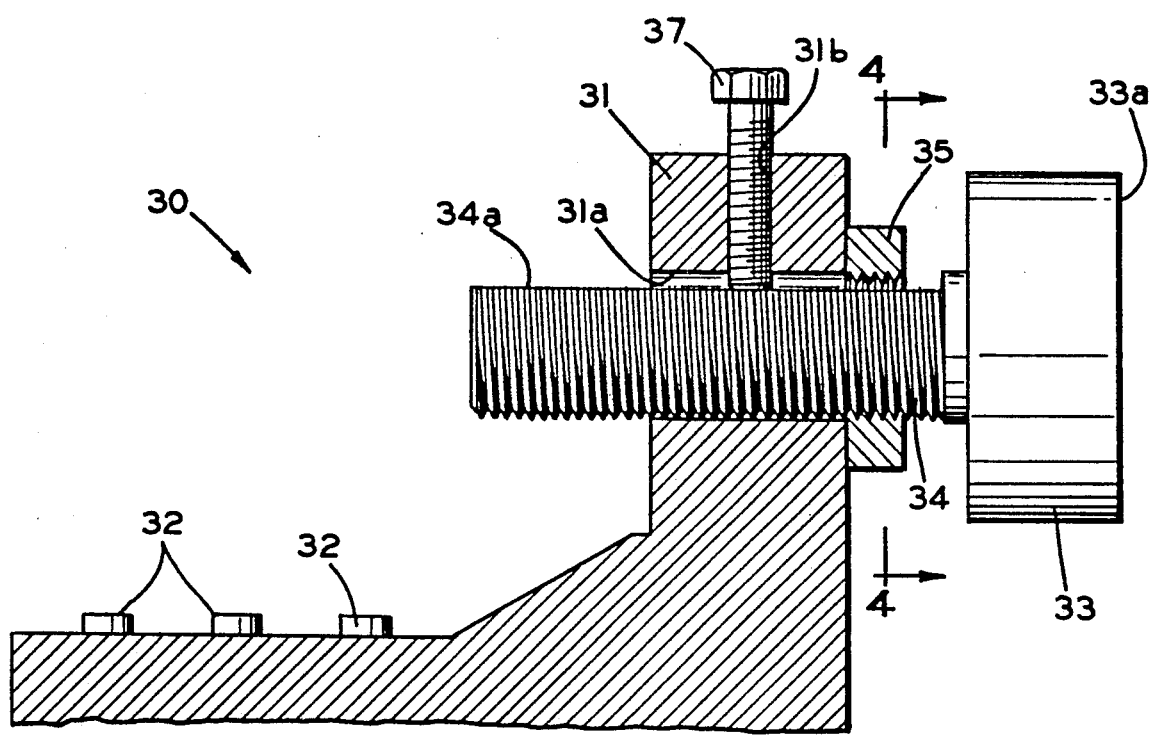
FIG. 3 is a side elevational view of an improved stock stop assembly in accordance with this invention.
Figure 4:
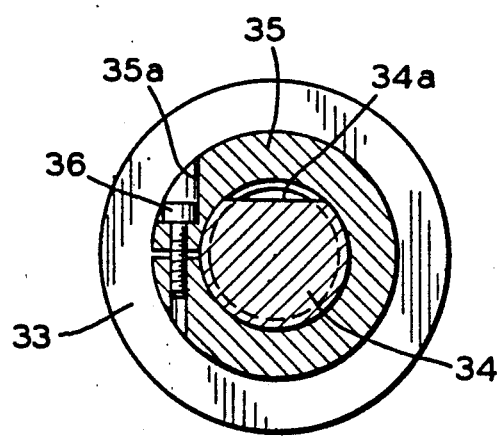
FIG. 4 is a sectional elevational view taken along line 4—4 of FIG. 3.

FIGS. 3 and 4 illustrate an improved stock stop assembly, indicated generally at 30, in accordance with this invention. As shown therein, the improved assembly 30 is also carried on a cast mounting bracket 31 which is secured to the spindle lathe 10 by a plurality of threaded fasteners 32. However, the bracket 31 has a non-threaded aperture 31a formed through the upstanding portion thereof. An improved stock stop, including an enlarged cylindrical head portion 33 and a threaded shank portion 34, is retained on the bracket 31 in a manner described further below. The head portion 33 of the stock stop includes a rearwardly facing flat abutment surface 33a which is adapted to be engaged by the forward end of the bar stock 14 during the stock feeding operation, as described above. The shank portion 34 is disposed within the aperture 31a. However, because the aperture 31a is non-threaded, the shank portion 34 does not otherwise cooperate with such aperture 31a. The shank portion 34 is milled to form a flat surface 34a thereon.

A locking collar 35 is threaded onto the shank portion 34 of the stock stop so as to be disposed between the head portion 33 thereof and the upstanding portion of the bracket 31. When the shank portion 34 of the stock stop is inserted within the aperture 31a of the bracket 31, the forward face of the locking collar 35 engages the rearward face of the bracket 31. This engagement positively positions the abutment surface 33a a predetermined distance rearwardly of the bracket 31. Thus, it can be seen that the axial position of the locking collar 35 on the shank portion 34 will determine the position of the abutment surface 33a relative to the rearward face of the bracket 31 and, hence, the forward end of the collet 15.

Means are provided for securing the locking collar 35 in a desired position on the shank portion 34 to prevent it from inadvertently moving during use. As shown in FIG. 4, the locking collar 35 is split so as to have a generally C-shaped configuration. A bore 35a is formed through the adjacent split ends of the lock nut 35. A portion of the bore 35a is threaded, and a threaded fastener 36 is disposed within the bore 35. When the threaded fastener 36 is tightened, the locking collar 35 is compressed about the shank portion 34. Consequently, the amount of friction between the threads of the locking collar 35 and the shank portion 34 is increased such that the locking collar 35 is locked in position on the shank portion 34.

The axial position of the locking collar 35 (and, therefore, the relative position of the abutment surface 33a) can be changed by rotating the locking collar 35 relative to the shank portion 34 of the stock stop. To accomplish this, the threaded fastener 36 is first loosened, thereby decreasing the amount of friction between the threads of the locking collar 35 and the shank portion 34. This allows the locking collar 35 to be rotated on the shank portion 34 to a new desired position. Once this desired position is achieved, the threaded fastener 36 is tightened to retain the locking collar 35 in that position on the shank portion 34.

As mentioned above, the shank portion 34 extends through the aperture 31a formed through the bracket 31. Means are provided for releasably retaining the shank portion 34 of the stock stock to the bracket. This means includes a transverse aperture 31b formed in the bracket 31. The transverse aperture 31b is threaded and extends into the aperture 31a. A threaded fastener 37 is threaded into the transverse aperture 31b. When tightened, the threaded fastener 37 extends through the transverse aperture 31b into engagement with the flat surface 34a of the shank portion 34. Such engagement is provided to retain the shank portion 34 of the stock stop in the aperture 31a for use. The threaded fastener 37 is loosened to permit removal of the stock stop from the bracket 31.

The improved stock stop of this invention is superior because it can be quickly and easily removed from the bracket 31 and the spindle lathe 10 for adjustment of the locking collar 35. To accomplish this, the threaded fastener 37 is loosened to permit the stock stop (together with the locking collar 35 secured to the shank portion 34) to be removed from the bracket 31 and the spindle lathe 10. Then, the threaded fastener 36 is loosened, allowing the locking collar 35 to be rotated to a desired position on the shank portion 34. This new position can easily be determined by any conventional device for measuring the axial distance between the rearwardly facing abutment surface 33a and the forward face of the locking collar 35. Once this desired position is achieved, the threaded fastener 36 is tightened to retain the locking collar 35 in that position on the shank portion 34. Then, the shank portion 34 is re-inserted through the aperture 31a until the forward face of the locking collar 35 engages the rearward face of the bracket 31. Lastly, the threaded fastener 37 is re-tightened to retain the stock stop in the bracket 31 for use.

The above-described adjustment process can be further expedited by providing a second stock stop and locking collar. While the first stock stop is installed on the bracket 31 during use, the relative position of the second locking collar on the shank portion of the second stock stop can be adjusted to the desired position for the next article to be formed. Then, when changing the set-up of the spindle lathe 10 to machine a different article, the first stock stop is removed and the second stock stop is installed. In literally a few seconds, therefore, the stock stop can be changed from one position to another.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A stock stop assembly adapted for use in a spindle lathe comprising:
  a bracket adapted to be secured to the spindle lathe, said bracket including an aperture formed therethrough;
  a stock stop including a head portion having an abutment surface and a shank portion disposed in said aperture;
  a locking collar mounted on said shank portion, said locking collar engaging said bracket when said shank portion is inserted within said aperture to define the position of said abutment surface relative to said bracket, said locking collar being split so as to have a generally C-shaped configuration;
  means for relaeasably locking said locking collar to said shank portion at a desired position thereon to prevent relative axial movement therebetween; and
  means for releasably retaining said stock stop on said bracket.

2. The invention defined in claim 1 wherein said aperture is non-threaded.

3. The invention defined in claim 1 wherein said shank portion of said stock stop is threaded.

4. The invention defined i claim 3 wherein said locking collar is threaded onto said threaded shank portion.

5. The invention defined in claim 1 wherein said means for releasably locking includes a threaded bore formed through the adjacent split ends of said locking collar and a threaded fastener extending through said bore.

6. The invention defined in claim 1 wherein said means for releasably retaining said stock stop on said bracket includes a second aperture formed in said bracket extending into said first aperture and a threaded fastener disposed in said second aperture, said threaded fastener selectively engaging said shank portion to releasably retain said stock stop on said bracket.

7. A stock stop assembly adapted for use in a spindle lathe comprising:
  a bracket adapted to be secured to the spindle lathe, said bracket including a non-threaded aperture formed therethrough;
  a stock stop including a head portion having an abutment surface and a shank portion slidably disposed in said non-threaded aperture;
  a locking collar mounted on said shank portion, said locking collar engaging said bracket when said shank portion is inserted within said aperture to define the position of said abutment surface relative to said bracket;

means for releasably locking said locking collar to said shank portion at a desired position thereon to prevent relative axial movement therebetween; and means for releasably retaining said stock stop on said bracket.

8. The invention defined in claim 7 wherein said shank portion of said stock top is threaded.

9. The invention defined in claim 8 wherein said locking collar is threaded onto said threaded shank portion.

10. The invention defined in claim 7 wherein said locking collar is split so as to have a generally C-shaped configuration.

11. The invention defined in claim 7 wherein said means for releasably locking includes a threaded bore formed through the adjacent split ends of said locking collar and a threaded fastener extending through said bore.

12. The invention defined in claim 7 wherein said means for releasably retaining said stock stop on said bracket includes a second aperture formed in said bracket extending into said first aperture and a threaded fastener disposed in said second aperture, said threaded fastener selectively engaging said shank portion to releasably lock said stock stop on said bracket.

* * * * *